United States Patent [19]
Yanagisawa et al.

[11] Patent Number: 6,036,375
[45] Date of Patent: Mar. 14, 2000

[54] OPTICAL SEMICONDUCTOR DEVICE HOUSING PACKAGE

[75] Inventors: Mitsuo Yanagisawa; Kenichi Ura; Satoru Tomie, all of Gamo-gun, Japan

[73] Assignee: Kyocera Corporation, Kyoto, Japan

[21] Appl. No.: 08/923,928

[22] Filed: Jul. 24, 1997

[30] Foreign Application Priority Data

| Jul. 26, 1996 | [JP] | Japan | 8-197906 |
| Jul. 26, 1996 | [JP] | Japan | 8-197907 |
| Jul. 26, 1996 | [JP] | Japan | 8-197910 |
| Jul. 29, 1996 | [JP] | Japan | 8-199269 |
| Jul. 31, 1996 | [JP] | Japan | 8-202621 |

[51] Int. Cl.$^7$ .................................................. G02B 6/36
[52] U.S. Cl. ............................ 385/94; 385/93; 385/88
[58] Field of Search .................................. 385/94, 92–93, 385/88–91

[56] References Cited

U.S. PATENT DOCUMENTS

| 3,827,785 | 8/1974 | Matsushita et al. | 350/413 |
| 4,119,362 | 10/1978 | Holzman | 350/96.18 |
| 4,706,256 | 11/1987 | Sheng et al. | 372/61 |
| 4,824,202 | 4/1989 | Auras | 350/96.18 |
| 5,215,489 | 6/1993 | Nakamura | 445/4 |
| 5,243,681 | 9/1993 | Bowen et al. | 385/140 |
| 5,347,605 | 9/1994 | Isaksson | 385/92 |
| 5,708,743 | 1/1998 | DeAndrea et al. | 385/88 |

FOREIGN PATENT DOCUMENTS

| 225810 | 1/1990 | Japan | 385/93 |
| 450903 | 2/1992 | Japan | 385/93 |

*Primary Examiner*—Rodney Bovernick
*Assistant Examiner*—Ellen E. Kim
*Attorney, Agent, or Firm*—Loeb & Loeb, LLP

[57] ABSTRACT

The invention relates to an optical semiconductor device housing package comprising a base having a mounting portion on an upper surface of which an optical semiconductor device is mounted; a frame attached to the base so as to encircle the mounting portion, the frame having a through-hole in one side thereof; a cylindrically shaped fixing member into which an optical fiber is inserted, the cylindrically shaped fixing member being fixed to the through-hole of the frame; a light-transmitting member attached to one end portion of the fixing member; and a lid member mounted on an upper face of the frame, for hermetically sealing the optical semiconductor device, wherein the light-transmitting member is formed of amorphous glass.

18 Claims, 2 Drawing Sheets

OPTICAL SEMICONDUCTOR DEVICE HOUSING PACKAGE

BACKGROUND OF THE INVENTION

1. Field of the Invention

The present invention relates to an optical semiconductor device housing package for housing an optical semiconductor device, and more particularly to an optical semiconductor device housing package designed to achieve high-efficiency transmission of light emitted by an optical semiconductor device, to an optical fiber.

2. Description of the Related Art

An optical semiconductor device housing package for housing an optical semiconductor device comprises a metal base, a metal frame Joined to the metal base, a fixing member mounted In the metal frame, a light-transmitting member attached to one end portion of the fixing member, and a lid member. The metal base is usually made of an iron-nickel-cobalt alloy, a copper-tungsten alloy, or other metallic material, and a mounting portion for mounting an optical semiconductor device is formed in the center of the upper surface thereof. A plurality of external lead terminals, passing through the metal base from the upper to the lower surface, are rigidly mounted, via an insulating member, around the periphery of the mounting portion. The metal frame is joined to the metal base by a brazing material such as silver brazing, in such a manner as to encircle the mounting portion, and a through-hole is formed in one side of the metal frame. The fixing member is fixed to the through-hole formed in the metal frame, and inside the fixing member is inserted an optical fiber for transferring optical signals from the optical semiconductor device to the outside. The fixing member is made of a metal such as an iron-nickel-cobalt alloy. The light-transmitting member is made of sapphire that closes the inside opening of the cylindrically shaped fixing member. The lid member is bonded to the upper face of the metal frame and hermetically seals the optical semiconductor device.

The optical semiconductor device is rigidly bonded to the mounting portion of the metal base, and the electrodes of the optical semiconductor device are electrically connected to the external lead terminals via bonding wires. Thereafter, the lid member is bonded to the upper face of the metal frame. In this way, the optical semiconductor device is hermetically sealed inside the container including the metal base, metal frame, and lid member, and the optical fiber is inserted in the inside of the cylindrically shaped fixing member.

Then, a driving signal from an external electrical circuit is supplied to the optical semiconductor device via the external lead terminals to drive the optical semiconductor device with the thus supplied driving signal to emit light, and the emission light is transmitted through the sapphire light-transmitting member to the optical fiber to propagation therethrough The attachment of the light-transmitting member to the cylindrically shaped fixing member is done by first baking a metallized layer of molybdenum-manganese (Mo—Mn) by a known Mo—Mn process at about 1500° C. onto the sapphire forming the light-transmitting member, and then brazing the metallized layer to the cylindrically shaped fixing member with a brazing material composed of a gold-tin alloy or the like.

However, with this prior art optical semiconductor device housing package, when transmitting the light emitted by the optical semiconductor device to the optical fiber via the light-transmitting member, the light emitted by the optical semiconductor device undergoes double refraction in the light-transmitting member in association with the crystallographic axes of the sapphire forming the light-transmitting member, with the result that only a portion of the light is transmitted to the optical fiber. The prior art thus has had the shortcoming that the efficiency of light transmission to the optical fiber, and hence the efficiency of optical signal transmission, degrades.

SUMMARY OF THE INVENTION

The present invention has been devised in view of the above shortcoming, and an object of the invention is to provide an optical semiconductor device housing package designed to improve the efficiency of transmission of the light emitted by the optical semiconductor to the optical fiber and thus enhance the efficiency of optical signal transmission.

The present invention provides an optical semiconductor device housing package comprising:

- a base having a mounting portion on an upper surface of which an optical semiconductor device is mounted;
- a frame attached to the base so as to encircle the mounting portion, the frame having a through-hole in one side thereof;
- a cylindrically shaped fixing member into which an optical fiber is inserted, the cylindrically shaped fixing member being fixed into the through-hole of the frame;
- a light-transmitting member attached to one end portion of the fixing member; and
- a lid member mounted on an upper face of the frame, for hermetically sealing the optical semiconductor device,
- wherein the light-transmitting member is formed of amorphous glass.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
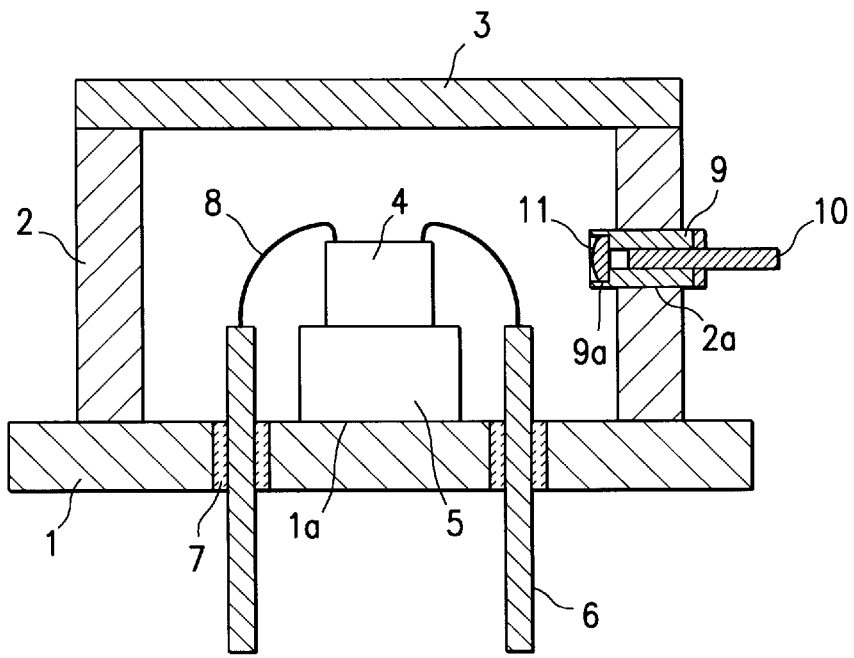
FIG. 1 is a sectional view showing one embodiment of an optical semiconductor device housing package according to the present invention.

Now referring to the drawings, preferred embodiments of the invention are described below.

Figure 2:
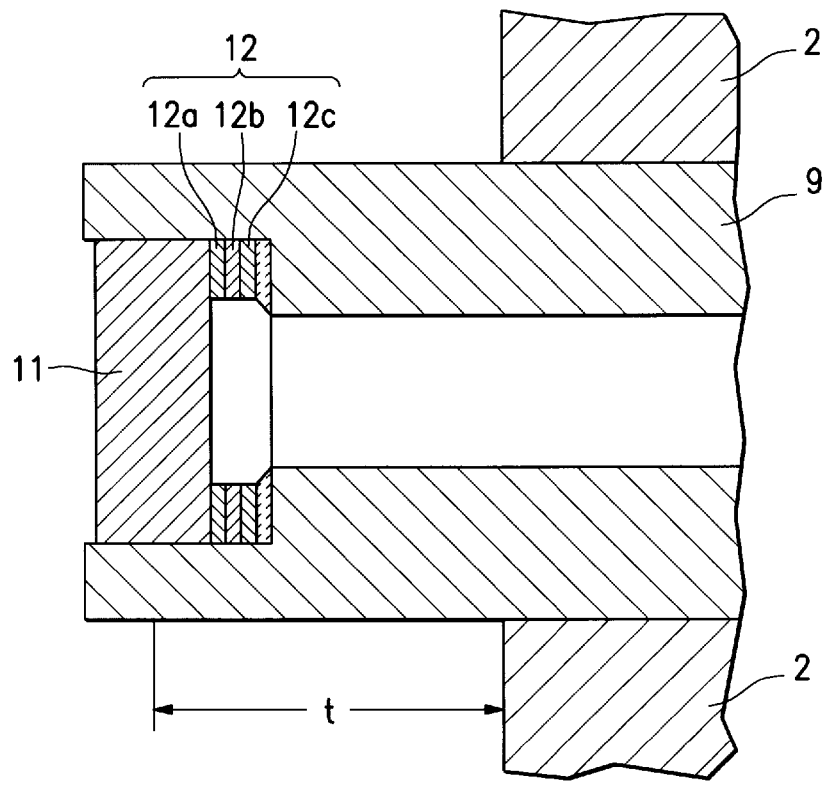
FIG. 2 is an enlarged sectional view of a main portion of the optical semiconductor device housing package shown in FIG. 1.

FIGS. 1 and 2 show embodiments of the semiconductor device housing package according to the present invention. Each of the semiconductor device housing packages shown in the figures comprises a base 1, a frame 2, and a lid member 3, which together form a container for housing an optical semiconductor device 4 therein.

The base 1 functions as a support member for supporting the optical semiconductor device 4 thereon, and has a mounting portion 1a for mounting the optical semiconductor device 4 substantially in the center of the upper surface thereof The optical semiconductor device 4 is bonded to be fixed to the mounting portion 1a by using an adhesive such as a gold-silicon brazing material, with a Peltier element 5 or the like interposed therebetween.

The base 1 is made of a metallic material such as an iron-nickel-cobalt alloy or copper-tungsten alloy, for example, in the case of an iron-nickel-cobalt alloy, the base 1 is made by working an iron-nickel-cobalt alloy ingot by a known metal forming process such as rolling or stamping.

If metallic layers having excellent corrosion resistance and high wettability for brazing material, more specifically a 2- to 6-μm thick nickel layer and a 0.5 to 5 μm thick gold layer are formed by plating on the outer surface of the base 1 in this order, not only the oxidation and corrosion of the base 1 can be effectively prevented but also the Peltier element 5 or the like underlying the optical semiconductor device 4 can be bonded securely to the upper surface of the base 1. Therefore, when it is desired to effectively prevent the oxidation and corrosion of the base 1 and to securely bond the Peltier element 5 or the like, underlying the optical semiconductor device 4, to the upper surface of the base 1, it is preferable that a 2 to 6 μm thick nickel layer and a 0.5 to 5 μm thick gold layer be formed by plating one on top of the other on the outer surface of the base 1.

Also, a plurality of external lead terminals 6 passing through the base 1 are rigidly mounted, via an insulating member 7 such as glass, around the periphery of the mounting portion 1a where the optical semiconductor device 4 is mounted.

The external lead terminals 6 have the function of electrically connecting the electrodes of the optical semiconductor device 4 to an external electrical circuit (not shown), and each electrode of the optical semiconductor device 4 is connected via a bonding wire 8 to one end of the corresponding lead terminal 6, the other end of which is connected to the external electrical circuit via a brazing material such as a solder.

The external lead terminals 6 are made of a metallic material such as an iron-nickel-cobalt alloy or an iron-nickel alloy. The external lead terminals 6 are fixed to the base 1 in such a manner that holes for accommodating the external lead terminals 6 are formed in the base 1, each hole having a diameter slightly larger than that of each external lead terminal 6, the lead terminals 6 and the annular glass insulating members 7 are inserted in the corresponding holes, and subsequently the insulating glass members 7 are melted by heating.

Further, a 1.0 μm to 20 μm thick layer of metal plate having excellent corrosion resistance and high wettability for blazing material, such as a nickel plating or a layer of gold plating, applied to surfaces of the external lead terminals can not only effectively prevent the external lead terminals from being subject to corrosion, but also further securely connect the external lead terminals 6 to the bonding wires 8. It is therefore preferable that a layer of metal plating having excellent corrosion resistance and high wettability for brazing material, such as a layer of nickel plating or a layer of gold plating, be formed to a thickness of 1.0 μm to 20 μm on the surface of each external lead terminal 6.

Further, the frame 2 is joined to the upper surface of the base 1 so as to encircle the mounting portion 1a where the optical semiconductor device 4 is mounted. Inside the frame 2 is formed an empty space for accommodating the optical semiconductor device 4.

The frame 2 is made of a metallic material such as an iron-nickel-cobalt alloy or an iron-nickel alloy, and is formed by pressing an ingot of an iron-nickel-cobalt alloy, for example, into a frame shape. The frame 2 Is attached to the base 1 by brazing the lower face of the frame 2 to the upper surface of the base 1 with a silver brazing material.

A through-hole 2a is formed in one side of the frame 2, and a cylindrically shaped fixing member 9 is mounted in the through-hole 2a.

In the interior space of the cylindrically shaped fixing member 9 is inserted an optical fiber 10 so as to face the optical semiconductor device 4 so that optical signals can be transferred between the optical fiber 10 and the optical semiconductor device 4.

Further, a planar light-transmitting member 11 is attached to one end portion of the cylindrically shaped fixing member 9, i.e., the portion positioned inside the frame 2. The light-transmitting member 11 thus closes the inside opening of the interior space of the fixing member 9 to keep hermetical sealing of the container and also to allow the light emitted by the optical semiconductor device 4 housed inside the container to pass therethrough to transmit to the optical fiber 10. In this embodiment, the Interior space of the one end portion of the cylindrically shaped fixing member 9 is made larger than that of the rest of the fixing member 9, and the light-transm itting member 11 is attached to this enlarged space 9a.

The cylindrically shaped fixing member 9 is made of a metallic material, such as an iron-nickel-cobalt alloy, iron-nickel alloy, oxygen free copper, or aluminum, and is inserted in the through-hole formed in one side of the frame 2 and is fixed to the frame 2 by joining a portion of the outer surface thereof to the frame 2 with a brazing material such as silver brazing.

In particular, if the cylindrically shaped fixing member 9 is formed of a soft metallic material such as oxygen free copper or aluminum, whose Young modulus is 5000 to 13000 kg/mm$^2$, then even if stress is exerted on the light-transmitting member 11 due to the difference in thermal expansion coefficient between the light-transmitting member 11 and the frame 2 when attaching the light-transmitting member 11 to the fixing member 9 by brazing, such stress is absorbed by deforming a portion of the soft fixing member 9, preventing the occurrence of a situation where a large stress is exerted on the light-transmitting member 11 causing cracking or other damage to the light-transmitting member 11. The hermetical sealing of the container can thus be retained, ensuring proper and stable operation of the optical semiconductor device 4 housed therein over a long period of time.

Here, if the cylindrically shaped fixing member 9 is formed of a metallic material with Young modulus of less than 5000 kg/mm$^2$, the fixing member 9 will be so soft, and accordingly stable fixation of the optical fiber 10 to the fixing member 9 can not be attained with the result that it is impossible to accurately transmit light emitted by the optical semiconductor device 4, to the optical fiber 10. Conversely, if the Young modulus exceeds 13000 kg/mm$^2$, the fixing member 9 will become hard, giving rise to the possibility of damaging the light-transmitting member 11 by the stress that occurs when fixing the light-transmitting member 11 to the fixing member 9. Accordingly, it is preferable that the cylindrically shaped fixing member 9 is formed of a metallic material whose Young modulus is within the range of 5000 to 13000 kg/mm$^2$.

Further, the fixing member 9 is mounted to the frame 2, as shown in FIG. 2, so that one end thereof protrudes 2 mm or more from the inner wall surface of the frame 2 and the light-transmitting member 11 is attached to the protruding one so as to keep a distance of 2 mm or more from the inner wall surface of the frame 2 (a distance between the center of the light-transmitting member 11 and the inner wall surface of the frame 2).

When the fixing member 9 is mounted to the frame 2, as shown in FIG. 2, so that one end thereof protrudes 2 mm or more from the inner wall surface of the frame 2 and the light-transmitting member 11 is attached to the protruding one by brazing so as to keep a distance of 2 mm or more from the inner wall surface of the frame 2, then if stress occurs due to the difference in thermal expansion coefficient between the two members when brazing the light-transmitting member 11 to the one end of the fixing member 9, the 2 mm or longer distance provided between the two members is sufficiently long to prevent the occurrence of large stress. As a result, damage to the light-transmitting member 11, such as cracking or breakage, is effectively prevented, thus ensuring the hermetical sealing of the container, and hence, proper and stable operation of the optical semiconductor device 4 housed therein over a long period of time.

On the other hand, if the position of the light transmitting member 11 attached to the fixing member 9 is at a distance of less than 2 mm from the inner wall surface of the frame 2, stress occurs between the light-transmitting member 11 and the frame 2 due to the difference in thermal expansion coefficient between the two members, at the time when the light-transmitting member 11 is brazed to the one end of the fixing member 9, and the stress may be exerted on the light-transmitting member 11, causing damage, such as cracking or breakage, to the light-transmitting member 11. Accordingly, it is preferable that the attachment position of the light-transmitting member 11 to the fixing member 9 be separated by 2 mm or more from the inner wall surface of the frame 2.

Further, the light-transmitting member 11 attached to the one end of the cylindrically shaped fixing member 9 has the function of transmitting light emitted by the optical semiconductor device 4 housed In the container and coupling it to the optical fiber 10, while keeping the hermetical sealing of the container by closing the inside opening of the interior space of the cylindrically shaped fixing member 9.

The light-transmitting member 11 is formed of amorphous glass, for example, lead-based amorphous glass of which principal components are silicon oxide and lead oxide; since this amorphous glass is devoid of crystallographic axes, when the light emitted by the optical semiconductor device 4 is transmitted through the light-transmitting member 11 to the optical fiber 10, the light emitted by the optical semiconductor device 4 is transmitted to the optical fiber 10 as it is transmitted without causing double refraction. This increases the transmission efficiency of the light emitted by the optical semiconductor device 4 to the optical fiber 10, and thus enhances the efficiency of optical signal transmission.

The light-transmitting member 11 made of such amorphous glass is formed into a prescribed shape by heating and melting raw glass material such as silicon oxide and lead oxide and filling the molten material into a prescribed mold, or by rolling a lump of heated and softened amorphous glass into a plate-like shape and cutting it with a diamond cutter.

Figure 3A:
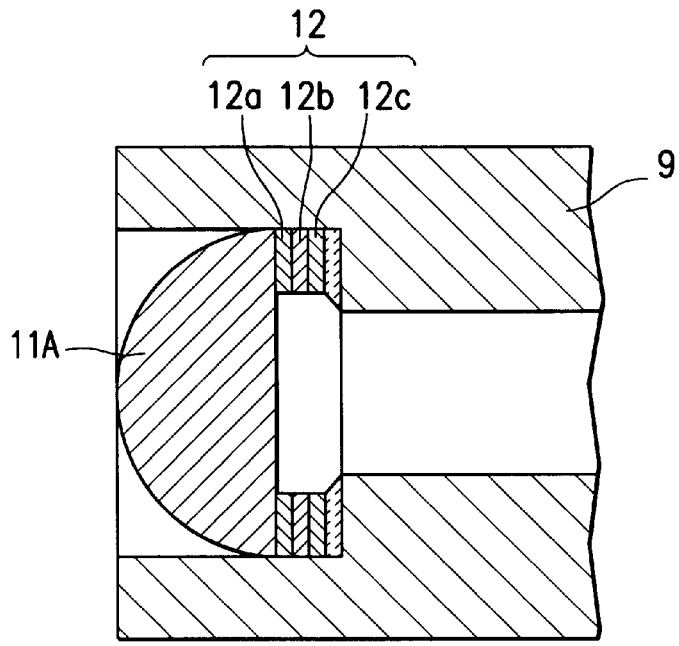
FIGS. 3A and 3B are enlarged sectional views of main portions of semiconductor device housing packages according to other embodiments of the present invention.
Figure 3B:
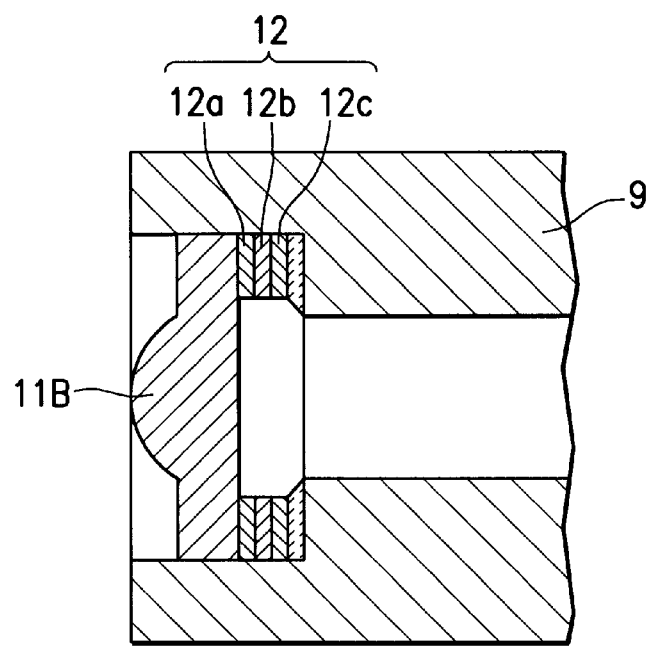

The light-transmitting member 11 made of amorphous glass can also be formed as shown in FIGS. 3A and 3B. The light-transmitting member 11A shown in FIG. 3A is composed of a hemispherical lens the entire portion of which is shaped in the form of a hemisphere, and the light-transmitting member 11B shown in FIG. 3B is composed of an aspherical lens whose center portion is shaped substantially in the form of a hemisphere. When the light-transmitting member 11A, 11B is formed as a hemispherical lens or aspherical lens as shown, the light emitted by the optical semiconductor device 4 is first converged through the light-transmitting member 11 and then enters the optical fiber 10. As a result, the light emitted by the optical semiconductor device 4 can be transmitted to the optical fiber 10 with higher efficiency, achieving extremely high efficiency of optical signal transmission. Accordingly, it Is preferable that the light-transmitting member 11 made of amorphous glass be formed as a hemispherical lens or aspherical lens.

Further, if the bubble content, i.e., the amount of bubbles contained in the light-transmitting member 11 made of amorphous glass, is controlled so that for a 100 $cm^3$ light-transmitting member irradiated with light, the bubble projection area is 0.03 $mm^2$ or less, the bubble content of the light-transmittlng member 11 is sufficiently low that when transmitting light emitted by the optical semiconductor device 4 through the light-transmitting member 11 to the optical fiber 10, the light emitted by the optical semiconductor device 4 hardly undergoes random reflections at the bubbles contained in the light-transmitting member 11, and is transmitted to the optical fiber 10. Extremely high efficiency of optical signal transmission can thus be achieved.

To reduce the amount of bubbles contained in the light-transmitting member to such a degree that for 100 $cm^3$ of light-transmitting member irradiated with light, the bubble projection area is 0.03 $mm^2$ or less, when forming the light-transmitting member 11 made of lead-based amorphous glass by heating and melting raw glass material such as silicon oxide and lead oxide, the heating and melting speed of the raw glass material is reduced and the material stirred at slow speed to minimize the possibility of entrapping air therein, and any entrapped air is released to the outside.

The light-transmitting member 11 is attached to the one end of the fixing member 9 by brazing; more specifically, the attaching of the light-transmitting member 11 to the fixing member 9 is done by first coating the circumferential portion of one main surface of the light-transmitting member 11 with a metallized layer 12, and then brazing the metallized layer 12 to the fixing member 9 with a brazing material such as a gold-tin alloy. In this case, since the light-transmitting member 11 is attached to the fixing member 9 by brazing with a gold-tin alloy or the like, the attachment is highly reliable, and at the brazed portion between the fixing member 9 and the light-transmitting member 11, the container housing the optical semiconductor device 4 can be thus completely hermetically sealed, with the result that proper and stable operation of the optical semiconductor device 4 contained in the container is ensured over a long period of time.

Further, since the melting point of the amorphous glass forming the light-transmitting member 11 is as low as about 700° C., the metallized layer 12 to be applied in advance to the circumferential portion of the one main surface of the light-transmitting member 11 cannot be formed by baking molybdenum-manganese by the known Mo—Mn process; therefore, the metallized layer 12 is formed by depositing the following three layers one on top of another: the first layer 12a formed of at least one material selected from the group including titanium, titanium-tungsten, and tantalum nitride, which are active against the amorphous glass and adhere firmly thereto; the second layer 12b formed of at least one material selected from the group including platinum, nickel, and nickel-chrome, which effectively prevent the first layer 12a from diffusing into the third layer 12c, described below, due to the heat generated when brazing the light-transmitting member 11 to the fixing member 9, and hence prevent the bonding strength of the metallized layer 12 to the light-transmitting member 11 from dropping; and the third layer 12c formed of at least one material selected from the group including gold, platinum, and copper, which improve the wettability of the metallized layer 12 for the brazing material and make the brazing material adhere firmly to the metallized layer 12 to securely attach the light-transmitting member 11 to the fixing member 9. In particular, if the metallized layer 12 is formed by sequentially depositing titanium, platinum, and gold, the bonding strength to the light-transmitting member 11 is greatly improved, and the wettability ror the brazing material is high, so that the light-transmitting member 11 can be securely brazed to the fixing member 9; therefore, this composition is most preferred for the metallized layer 12.

The metallized layer 12 having the three-layered structure consisting of the first layer 12a formed of at least one material selected from the group including titanium, titanium-tungsten, and tantalum nitride, the second layer 12b formed of at least one material selected from the group including platinum, nickel, and nickel-chrome, and the third layer 12c formed of at least one material selected from the group including gold, platinum, and copper, is formed by depositing each metallic material or nitride to a prescribed thickness by sputtering, evaporation, ion-plating, or plating, one on top of another on the circumferential portion of the one main surface of the light-transmitting member 11.

In the case of forming the metallized layer 12 from the first layer 12a formed of at least one material selected from the group including titanium, titanium-tungsten, and tantalum nitride, the second layer 12b formed of at least one material selected from the group including platinum, nickel, and nickel-chrome, and the third layer 12c formed of at least one material selected from the group including gold, platinum, and copper, when the thickness of the first layer 12a is less than 500 angstroms, the bonding strength of the metallized layer 12 to the light-transmitting member 11 tends to become weak, and when the thickness is greater than 2000 angstroms, a large stress tends to be induced in the first layer 12a when depositing the first layer 12a on the light-transmitting member 11, resulting in the tendency for the first layer 12a to become separated from the light-transmitting member 11 due to the internal stress. Accordingly, it is preferable that the thickness of the first layer 12a be set within a range of 500 to 2000 angstroms. Likewise, when the thickness of the second layer 12b is less than 500 angstroms, it will become impossible to effectively prevent the first layer 12a from diffusing into the third layer 12c due to the heat generated when brazing the light-transmitting member 11 to the fixing member 9, giving rise to the possibility of decreasing the bonding strength of the metallized layer 12 to the light-transmitting member 11; when the thickness is greater than 10000 angstroms, a large stress tends to be induced in the second layer 12b when depositing the second layer 12b on top of the first layer 12a, resulting in the tendency for the second layer 12b to become separated from the first layer 12a due to the internal stress. Accordingly, it is preferable that the thickness of the second layer 12b be set within a range of 500 to 10000 angstroms. Further, when the thickness of the third layer 12c is less than 0.5 µm, the wettability of the metallized layer 12 for the brazing material does not improve sufficiently with the result that there is a tendency to make it difficult to braze the light-transmitting member 11 securely to the fixing member 9. When the thickness is greater than 5 µm, a large stress tends to be induced in the third layer 12c when depositing the third layer 12c on top of the second layer 12b, resulting in the tendency for the third layer 12c to become separated from the second layer 12b due to the internal stress. Accordingly, it is preferable that the thickness of the third layer 12c be set within a range of 0.5 to 5 µm.

The lid member 3, which is made of a metallic material such as an iron-nickel-cobalt alloy or iron-nickel alloy, is bonded to the upper face of the frame 2, and the optical semiconductor device 4 is thus hermetically sealed inside the container consisting of the base 1, frame 2, and lid member 3.

The bonding of the lid member 3 to the upper face of the frame 2 is done, for example, by welding such as seam welding process.

The lid member 3 is formed into a prescribed shape by working an ingot formed, for example, of an iron-nickel-cobalt alloy or the like by a known metal forming process such as rolling or stamping.

Thus, in the foregoing optical semiconductor device housing package, the optical semiconductor device 4 is mounted and held fixed on the optical semiconductor device mounting portion la of the base 1 with the Peltier element 5 or the like interposed therebetween, and the electrodes of the optical semiconductor device 4 are electrically connected to the external lead terminals 6 via the bonding wires 8; then, the lid member 3 is bonded to the upper face of the frame 2, thus housing the optical semiconductor device 4 inside the container consisting of the base 1, frame 2, and lid member 3, and finally, the optical fiber 10 is inserted in the fixing member 9 attached to the frame 2, thereby completing the assembling of the packaged optical semiconductor device as an end product.

The thus assembled packaged optical semiconductor device is used, for example, in high-speed optical communication applications, in which a driving signal from an external electrical circuit is supplied to the optical semiconductor device 4 via the external lead terminals 6, and the optical semiconductor device 4 transmits light corresponding to the driving signal, the emission light then being transmitted through the light-transmitting member 11 made of amorphous glass and transmitted to the optical fiber 10 for propagation therethrough.

According to the present invention, since the light-transmitting member is formed of amorphous glass devoid of crystallographic axes, when passing the light emitted by the optical semiconductor device through the light-transmitting member to the optical fiber, the light emitted by the optical semiconductor device is transmitted to the optical fiber as it is transmitted without causing double refraction, and the efficiency of optical signal transmission is thus increased.

According to the optical semiconductor device housing package of the present Invention, when the light-transmitting member is formed as a hemispherical or aspherical lens, the light emitted by the optical semiconductor device is fi.rst converged through the light-transmitting member and then enters the optical fiber. In this way, the light emitted by the optical semiconductor device can be transmitted to the optical fiber with high efficiency, which greatly improves the efficiency of optical signal transmission.

Furthermore, according to the optical semiconductor device housing package of the present invention, when the amount of bubbles contained in the light-transmitting member made of amorphous glass is controlled so that for 100 cm$^3$ of light transmitting member irradiated with light, the bubble projection area is 0.03 mm$^2$ or less, then when passing the light emitted by the optical semiconductor device through the light-transmitting member to the optical fiber, the light emitted by the optical semiconductor device seldom undergoes random reflections at the bubbles contained in the light-transmitting member, and is transmitted to the optical fiber. Extremely high efficiency of optical signal transmission can thus be achieved.

Although the optical semiconductor device housing package according to the present invention has been described with reference to the preferred embodiments thereof, it will be appreciated that the invention is not limited to the illustrated embodiments but various modifications are possible without departing from the essential characteristics of the invention.

For example, in the above embodiments, the external lead terminals 6 are fixed to the base 1, but instead, these terminals may be fixed to the frame 2. Further, the surface of the light-transmitting member 11 may be coated with a nonreflective layer, if necessary. In this case, since the light emitted by the optical semiconductor device 4 is transmitted through the light-transmitting member 11 without being reflected on the surface of the light-transmitting member 11, the light emitted by the optical semiconductor device 4 can be efficiently transmitted to the optical fiber 10.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore Intended to be embraced therein.

What is claimed is:

1. An optical semiconductor device housing package comprising:
    a base having a mounting portion on an upper surface of which an optical semiconductor device is mounted;
    a frame attached to the base so as to encircle the mounting portion, the frame defining a through-hole in one side thereof;
    a cylindrically shaped fixing member into which an optical fiber is inserted, the cylindrically shaped fixing member being fixed to the through-hole of the frame;
    a light-transmitting member attached to one end portion of the fixing member, wherein the light-transmitting member has at least one substantially flat surface perpendicular to an axis of optical transmission for affixing against the fixing member; and
    a lid member mounted on an upper face of the frame, for hermetically sealing the optical semiconductor device, wherein the light-transmitting member is formed of amorphous glass, and wherein the light-transmitting member formed of amorphous glass contains such an amount of bubbles that an area of bubbles projected when a 100 cm$^3$ light-transmitting member is irradiated with light, is 0.03 mm$^2$ or less.

2. The optical semiconductor device housing package of claim 1, wherein the light-transmitting member is formed of lead-based amorphous glass of which principal components are silicon oxide and lead oxide.

3. The optical semiconductor device housing package of claim 1, wherein the light-transmitting member formed of amorphous glass is at least one of a hemispherical and aspherical lens.

4. The optical semiconductor device housing package of claim 1, wherein tbe fixing member protrudes through the through-hole of the frame so that the light-transmitting member formed of amorphous glass that is attached to the fixing member is disposed at a position 2 mm or more distant from the through-hole of the frame.

5. The optical semiconductor device housing package of claim 1, wherein a metallized layer is deposited an the light-transmitting member formed of amorphous glass, and the light-transmitting member is attached to the fixing member by brazing the metallized layer using a brazing material formd of a gold-tin alloy.

6. The optical semiconductor device housing package of claim 5, wherein the metallized layer is composed of a first layer formed of at least one mateial selected from a group including titanium, titanium-tugsten, and tantalum nitride, a second layer formed of at least one material selected from a group including platinum, nickel, and nickel-chromium, and a third layer formed of at least one material selected from a group including gold, platinum, and copper.

7. The optical semiconductor device housing package of claim 6, wherein the first layer of the metallized layer has a thickness of 500 to 2000 Å, the second layer has a thickness of 500 to 10000 Å, and the third layer has a thickness of 0.5 to 5 $\mu$m.

8. The optical semiconductor device housing package of claim 1, wherein the fixing member has a Young modulus of 5,000 to 13,000 kg/mm$^2$.

9. The optical semiconductor device housing package of claim 8, wherein the fixing member is formed of either oxygen free copper or aluminum.

10. An optical semiconductor device housing package comprising:
    a base having a mounting portion on an upper surface of which an optical semiconductor device is mounted;
    a frame attached to the base so as to encircle the mounting portion, the frame defining a through-hole in one side thereof;
    a cylindrically shaped fixing member into which an optical fiber is inserted, the cylindrically shaped fixing member being fixed to the through-hole of the frame;
    a light-transmitting member attached to one end portion of the fixing member, wherein the light-transmitting member has at least one substantially flat surface perpendicular to an axis of optical transmission for affixing against the fixing member; and
    a lid member mounted on an upper face of the frame, for hermetically sealing the optical semiconductor device, wherein the light-transmitting member is formed of amorphous glass and the fixing member has a Young modulus of 5,000 to 13,000 kg/mm$^2$.

11. The optical semiconductor device housing package of claim 10, wherein the fixing member is formed of either oxygen free copper or aluminum.

12. The optical semiconductor device housing package of claim 10, wherein the light-transmitting member is formed of lead-based amorphous glass of which principal components are silicon oxide and lead oxide.

13. The optical semiconductor device housing package of claim 10, wherein the light-transmitting member formed of amorphous glass is at least one of a hemispherical and aspherical lens.

14. The optical semiconductor device housing package of claim 10, wherein the light-transmitting member formed of amorphous glass contains such an amount of bubbles that an area of bubbles projected when a 100 cm$^3$ light-transmitting member is irradiated with light, is 0.03 mm$^2$ or less.

15. The optical semiconductor device housing package of claim 10, wherein the fixing member protrudes through the through-hole of the frame so that the light-transmitting member formed of amorphous glass that is attached to the fixing member is disposed at a position 2 mm or more distant from the through-hole of the frame.

16. The optical semiconductor device housing package of claim 10, wherein a metallized layer is deposited on the light-transmitting member formed of amorphous glass, and the light-transmitting member is attached to the fixing member by brazing the metallized layer using a brazing material formed of a gold-tin alloy.

17. The optical semiconductor device housing package of claim 16, wherein the metallized layer is composed of a first layer formed of at least one material selected from a group including titanium, titanium-tungsten, and tantalum nitride, a second layer formed of at least one material selected from a group including platinum, nickel, and nickel-chromium, and a third layer formed of at least one material selected from a group including gold, platinum, and copper.

18. The optical semiconductor device housing package of claim 17, wherein the first layer of the metallized layer has a thickness of 500 to 2000 Å, the second layer has a thickness of 500 to 10000 Å, and the third layer has a thickness of 0.5 to 5 $\mu$m.

* * * * *